(12) United States Patent
Petersen et al.

(10) Patent No.: US 12,405,621 B2
(45) Date of Patent: Sep. 2, 2025

(54) VALVE AND METHOD FOR OPERATING A VALVE

(71) Applicant: Fisher Control International LLC, Marshalltown, IA (US)

(72) Inventors: Adam Petersen, Marshalltown, IA (US); Scott Losing, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 122 days.

(21) Appl. No.: 18/305,640

(22) Filed: Apr. 24, 2023

(65) Prior Publication Data

US 2023/0341877 A1   Oct. 26, 2023

Related U.S. Application Data

(60) Provisional application No. 63/333,967, filed on Apr. 22, 2022.

(51) Int. Cl.
    *G05D 9/12* (2006.01)
(52) U.S. Cl.
    CPC ..................... *G05D 9/12* (2013.01)
(58) Field of Classification Search
    CPC .. G05D 9/12; G05D 7/0635; Y10T 137/7287; Y10T 137/7313; Y10T 137/7306
    See application file for complete search history.

(56) References Cited

U.S. PATENT DOCUMENTS 5,335,185 A * 8/1994 Pitts .................. G05D 9/12
                                                 700/282

FOREIGN PATENT DOCUMENTS

DE         4007282 A1 *  9/1991

OTHER PUBLICATIONS

Machine English translation of DE4007282A1 (Year: 2025).*
Instruction Manual, "Fisher™ D3 Control Valve with Gen 2 easy-Drive™ Electric Actuator", https://www.emerson.com/en-us/catalog/fisher-easy-drive, Apr. 2022, 36 pages.

* cited by examiner

*Primary Examiner* — Hailey K. Do
(74) *Attorney, Agent, or Firm* — Quarles & Brady LLP (57) ABSTRACT

A valve assembly for a process fluid is disclosed that includes an integrated controller configured to control an on-off valve actuator based on signals from a sensor that indicates a measured parameter of the process fluid. The integrated controller is further configured to: (i) in response to receiving a first signal corresponding to an open-position valve command signal, control the on-off valve actuator to move the valve element from a starting position to a first partially-open position, (ii) evaluate a first criteria condition for further actuation of the valve element, (iii) in response to the first criteria condition being satisfied, control the on-off valve actuator to move the valve element to a second partially-open position, and (iv) in response to receiving a second signal corresponding to a closed-position valve command signal, control the on-off valve actuator to move the valve element to the closed position.

17 Claims, 3 Drawing Sheets

VALVE AND METHOD FOR OPERATING A VALVE

CROSS-REFERENCE TO RELATED APPLICATIONS

This application claims priority to U.S. provisional application no. 63/333,967, titled "VALVE AND METHOD FOR OPERATING A VALVE" and filed Apr. 22, 2022, the entirety of which is incorporated herein by reference.

BACKGROUND

Valves, including control valves, can be used in a wide variety of applications including process plants such as refineries, chemical plants, and paper plants, among many others. In some applications, valves with on-off actuators can be used to control flow along particular flow paths of a processing system (e.g., drainage flow paths for separators).

SUMMARY

Generally, examples of the present disclosure can provide improved control over systems with on-off valve actuators, including as may beneficially allow a more metered drainage (or other) flow for separator tanks or other process equipment. For example, via successive selectively timed signals to an on-off actuator, valves according to some implementations can be moved to successive (e.g., successively more open) partially-open positions between closed and open positions of the valves. This can help to reduce wear of valves during operation, as well as generally improving system performance (e.g., for control of separator levels) and component lifespans.

Some examples of the present disclosure provide a valve assembly for a process fluid that can include a valve body defining an internal passage that directs flow of the process fluid from a valve inlet through the valve body to a valve outlet, a valve element in fluid communication with the internal passage and moveable between a closed position that blocks flow through the internal passage and an open position that permits flow through the internal passage, an on-off valve actuator operatively coupled to the valve element and configured to selectively move the valve element to the open position and the closed position, and an integrated controller configured to control the on-off valve actuator to move the valve element (e.g., in electrical or fluid communication with the on-off valve actuator). The integrated controller can receive signals from one or more sensors that can indicate one or more measured parameters of the process fluid. The integrated controller can be further configured to: (i) in response to receiving a first signal from the one or more sensors that corresponds to an open-position valve command, control the on-off valve actuator to move the valve element from a starting position to a first partially-open position of a plurality of partially-open positions between the open and closed positions, (ii) with the valve element in the first partially-open position, evaluate a first criteria condition for further actuation of the valve element, (iii) in response to the first criteria condition being satisfied, control the on-off valve actuator to move the valve element to a second partially-open position of the plurality of partially-open positions, and (iv) in response to receiving a second signal from the one or more sensors that corresponds to a closed-position valve command, control the on-off valve actuator to move the valve element to the closed position.

In some implementations, the first criteria condition can be a predetermined threshold elapsed time. In such implementations, the integrated controller can be further configured to: (i) with the valve element in the second partially-open position, evaluate a second criteria condition for further actuation of the valve element, and (ii) in response to the second criteria condition being satisfied, control the on-off valve actuator to move the valve element to a third position that is either a third partially-open position of the plurality of partially-open positions or the open position.

In some implementations, the second partially-open position can be between the first partially-open position and the open position. In some implementations, the integrated controller can be further configured to receive a user input that can define one or more of the first or second partially-open positions. In such implementations, the integrated controller can be further configured to receive a user input that can designate a subset of enabled partially-open positions of the plurality of partially-open positions and to select the first and second partially-open positions from the subset of enabled partially-open positions.

In some implementations, the plurality of partially-open positions can includes at least three partially-open positions. In some implementations, the inlet of the valve body can be in fluid communication with a separator tank of a processing system, and the one or more sensors can be arranged to sense the one or more measured parameters of the process fluid within the separator tank. In such implementations, the one or more measured parameters can include a fluid level in the separator tank, and the one or more sensors can include a level sensor arranged to measure the fluid level in the separator tank.

In some implementations, the integrated controller can be further configured to determine a present flow rate of process fluid through the internal passage of the valve body that can be based on signals from the one or more sensors. In some implementations, the integrated controller can be further configured to receive a user input that can define the first threshold criteria.

Some examples of the present disclosure provide a method of operating a valve of a processing system that can include a valve body that can define an internal passage that can direct flow of a process fluid received from an inlet of the valve body through the valve to an outlet of the valve body, a valve element that can be in fluid communication with the internal passage and that can be moveable between an open position and a closed position, an on-off valve actuator that can be operatively coupled to the valve element to move the valve element between the open and closed positions, and an integrated controller that can be configured to control the on-off valve actuator to move the valve element and to receive signals from one or more sensors that can indicate one or more measured parameters of the process fluid. The method can include in response to receiving a first signal from the one or more sensors that can correspond to an open-position valve command, controlling the on-off valve actuator to move the valve element from a starting position to a first partially-open position of a plurality of partially-open positions, and, with the valve element in the first partially-open position, evaluating a first criteria condition for further actuation of the valve element. The method can also include in response to the first criteria condition being satisfied, controlling the on-off valve actuator to move the valve element to a second partially-open position of the plurality of partially-open positions, and, in response to receiving a second signal from the one or more sensors that can correspond to a closed-position valve command, controlling the on-off valve actuator to move the valve element to the closed position.

In some implementations, the first criteria condition can be a first predetermined threshold elapsed time. In some such implementations, the inlet of the valve can be in fluid communication with a separator tank of the processing system, and the first signal from the one or more sensors can indicate a fluid level of the process fluid within the separator tank. In other such implementations, the method can further include, with the valve element in the second partially-open position, evaluating a second criteria condition that can be a second predetermined threshold elapsed time for further actuation of the valve element, and, in response to the second criteria condition being satisfied, controlling the on-off valve actuator to move the valve element to a third position that can be either a third partially-open position of the plurality of partially-open positions or the open position. In other such implementations, the method can further include, with the integrated controller, receiving a user input that can designate a subset of enabled partially-open positions of the plurality of partially-open positions, which can include the first and second partially-open positions. In other such implementations, the first partially-open position can be between the starting position and the open position, and the second partially-open position can be between the first partially-open position and the open position. In other such implementations, a user can define the first threshold criteria.

Some examples of the present disclosure provide a method of retrofitting a valve assembly of a processing system. The valve assembly can include a valve body that can define an internal passage that can direct flow of a process fluid received from an inlet of the valve body through the valve body to an outlet of the valve body, a valve element that can be in fluid communication with the internal passage and that can be moveable between an open position and a closed position, an on-off valve actuator that can be operatively coupled to the valve element to move the valve element between the open and closed positions, and an integrated controller that can be configured to control the on-off valve actuator to move the valve element and to receive signals from one or more sensors that can indicate one or more measured parameters of the process fluid. The method can include updating a firmware of the integrated controller of the valve assembly such that the integrated controller can be further configured to: (i) in response to receiving a first signal from the one or more sensors that can correspond to an open-position valve command, control the on-off valve actuator to move the valve element from a starting position to a first partially-open position of a plurality of partially-open positions, (ii) with the valve element in the first partially-open position, evaluate a first criteria condition for further actuation of the valve element, (iii) in response to the first criteria condition being satisfied, control the on-off valve actuator to move the valve element to a second partially-open position of the plurality of partially-open positions, and (iv) in response to receiving a second signal from the one or more sensors that corresponds to a closed-position valve command, control the on-off valve actuator to move the valve element to the closed position.

BRIEF DESCRIPTION OF THE DRAWINGS

The accompanying drawings, which are incorporated in and form a part of this specification, illustrate examples of the present disclosure and, together with the description, serve to explain the principles of examples of the present disclosure.

DETAILED DESCRIPTION

The following discussion is presented to enable a person skilled in the art to make and use implementations of the present disclosure. Various modifications to the illustrated implementations will be readily apparent to those skilled in the art, and the generic principles herein can be applied to other implementations and applications without departing from examples of the present disclosure. Thus, implementations of the present disclosure are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of implementations of the disclosed technology. Skilled artisans will recognize the examples provided herein have many useful alternatives and fall within the scope of examples of the present disclosure.

Before any implementations of the present disclosure are explained in detail, it is to be understood that the present disclosure is not limited in its application to the details of construction and the arrangement of components set forth in the following description or illustrated in the attached drawings. The present disclosure is capable of other implementations and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items. The use of "about" or "approximately" and variations thereof herein is meant to refer to variation in the numerical quantity that may occur, for example, through the measuring of pressures or temperatures within various portions of a valve assembly that may include implementations of the disclosure herein; through inadvertent error in these procedures; through differences in the accuracy or precision of various components used to carry out the methods; and the like. Throughout the disclosure, the terms "about" and "approximately" are intended to refer to a range of values ±5% of the numeric value that the term proceeds, inclusive.

As briefly discussed above, a valve can be used to control flow of a process fluid (or a byproduct from processing of a process fluid) from particular components of a processing system by selectively inhibiting or permitting flow through the valve. For example, in some applications, a valve can be arranged on a drain line of a separator tank of a processing system to selectively drain accumulated fluids from the separator tank. As generally known, for example, a valve can have a valve body with a valve inlet and a valve outlet, and a flow passage that extends between the valve inlet and outlet and through the valve body. A valve element of the valve can be in fluid communication with the flow passage and can be moveable between a closed position to block flow through the internal passage and an open position to permit flow through the internal passage. Some valves can be manually operated, while for other valves the valve element is typically moved between the open and closed positions by a valve actuator, such as, for example, a motor or a piston. To ensure that the valve is properly opened or closed throughout operation of the process fluid system, a controller of the valve can be utilized to control the actuator to move the valve element remotely or automatically during operations.

Many process applications, including those involving liquid or gaseous mixtures containing hydrocarbons, utilize valves requiring a significant number of cycles between the open and closed positions to drain amounts of separated fluids during operations of the processing system. Conventional solutions to meet the requirements of such operating conditions utilize valves having on-off valve actuators (i.e., actuators that are configured to receive control signals only as commands to stroke to a fully stroked position from a fully retracted position (or vice versa), and thus move the valve element between only a fully closed position and a fully open position). On-off valves (i.e., valves operated by on-off actuators) can be preferred for many applications, including due to the simplicity and relative inexpensiveness of such actuators. However, this solution can have undesirable effects on the operation and performance of the valve. For instance, it has been found that the significant number of cycles in combination with the amount of travel between the fully stroked and the fully retracted positions can lead to wear of the valve actuator of the valve. Modern valves sometimes utilize valve actuators that can vary stroke lengths for movement between the fully retracted position toward the fully open position, such as, e.g., position modulating valves. However, in many applications, such valves can be relatively expensive and overly complex for a given operation within a processing system. Further, existing control systems may not be practically arranged to be reprogrammed—particularly on in-field sites—or otherwise reconfigured using existing solutions, to better control on-off valves for extended operation.

Examples of the present disclosure can address these issues, including by providing a valve having an on-off valve actuator that can move a valve element to a plurality of partially-open positions that are between the (fully) closed and (fully) open positions based on evaluation of control signals and time thresholds, flow characteristics (e.g., flow rates), or other criteria conditions. For example, some implementations provide a valve having an integrated (or other) controller that is configured to control the on-off valve actuator to move the valve element to the partially-open positions, such as, for example, by conditioning or otherwise varying the electrical signal (e.g., motor command signal) or other signal supplied to the on-off valve actuator (or via other known control signal modulations). In other words, a valve normally configured for on-off operation can be instead controlled according to the principles disclosed herein to provide a plurality of intermediate valve positions between fully opened and fully closed. This valve configuration can limit the amount of travel and number of cycles of the on-off valve actuator during operations to reduce wear on the actuator, including by partially stroking the actuator to one or more partially-open positions of the valve element rather than fully stroking the actuator to the open position each time the valve is moved from the closed position. For example, in some implementations, a first partially-open position of the valve element can be between a starting position (e.g., the closed position, or other reference position at which the valve starts for a particular operation) and the open position. Similarly, a second partially-open position can be between the first partially-open position and the closed position. In other words, a set of partially-open positions can be specified at regular or other angular (or other) intervals between an open position and a closed position (e.g., successively more open in regular angular intervals). Correspondingly, valves according to different examples can be controlled to move in various patterns among partially-open positions, including in successive steps between adjacent positions or in larger positional jumps.

In some implementations, the integrated (or other) controller of the valve can be further configured to receive signals from one or more sensors that can be configured to measure one or more parameters that can be used as open-position and closed-position commands to the integrated controller. For example, some implementations provide a valve in fluid communication with a separator tank having a sensor that is in electrical communication with the integrated controller of the valve. A first signal received from the sensor, such as, e.g., a signal corresponding to a first level of fluid within the separator tank, can correspond to an open-position command, and a second signal received from the sensor, such as, e.g., a signal corresponding to a second level of fluid within the separator tank that is less than the first level, can correspond to a closed-position command. The integrated controller of the valve can be further configured to control the on-off valve actuator to move the valve element to one or more of the plurality of partially-open positions in response to the open-position command. This configuration can provide reduced wear of the on-off valve actuator while ensuring that a sufficient amount of fluid is drained from the separator tank, and in some cases, without fully stroking the on-off valve actuator.

Examples of the present disclosure can also provide a method for operating a valve having an on-off valve actuator and an integrated (or other) controller that receives signals from one or more sensors that indicates one or more measured parameters of process fluid. For example, some implementations provide an integrated controller that can operate an on-off valve actuator to move the valve element to a first partially-open position in response to receiving a first signal from one or more sensors corresponding to an open-position valve command (e.g., a binary level signal corresponding to a command to open the on-off valve). In other words, for example, upon receiving a signal from a level sensor that indicates required drainage of a vessel, an adjusted control signal can be provided to the on-off actuator to open the valve only partially (e.g., rather than fully open, as under normal operation of an on-off valve system). With the valve thus partially open, the controller can then evaluate a first criteria condition relative to further actuation of the valve element, and can move the valve element to a second partially-open position of the plurality of partially-open positions if the first criteria condition is satisfied. For example, upon passage of a predetermined elapsed time or a satisfaction of a flow (e.g., flowrate) criterion, a controller can control a valve to move to a more open position (e.g., a next enabled partially-open position). The integrated controller can also generally move the element to (or toward) the closed position in response to receiving a second signal from the one or more sensors that corresponds to a closed-position valve command (e.g., a binary level signal corresponding to a command to close the on-off valve) or other relevant close-position signal.

Examples of the present disclosure can also provide a method for retrofitting a valve having an integrated controller and an on-off valve actuator. For example, due to the disclosed improved control logic for an on-off actuator and associated signal inputs, some implementations can allow valves to be retrofitted via firmware updates for the integrated controller of the valve, rather than through installation of additional controllers or actuators, updates to external controllers or remote terminal units, etc.

The principles of the present disclosure are applicable to various types of valves and valve assemblies, such as, e.g., gate valves, ball valves, butterfly valves, and globe valves, as well as, various types control valves, such as, e.g., sliding stem control valves and rotary shaft control valves. Accordingly, discussion below of particular valve types or contexts is not intended to be limiting.

Figure 1:
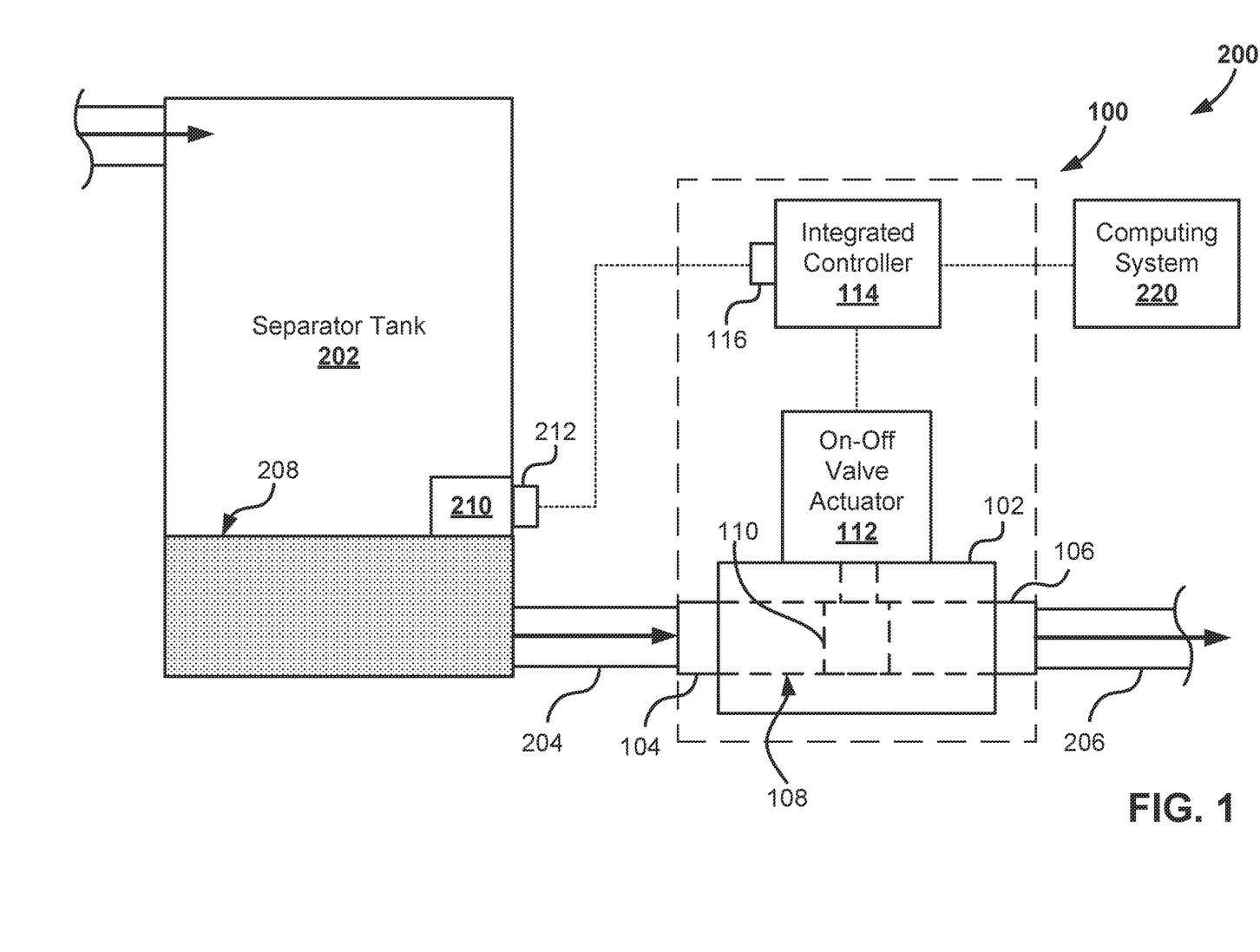
FIG. 1 is a schematic view of an exemplary valve in communication with a separator tank of a fluid processing system, in accordance with principles of the present disclosure.

Referring now to FIG. 1, an example of a valve assembly 100 in fluid communication with a separator tank 202 of a processing system 200 is shown. The valve assembly 100 can be a valve of any variety of known configurations for controlling flow along a flow path therethrough, and can have an actuator, and an integrated controller configured in accordance with the principles of the present disclosure. Likewise, the processing system can be a system of any variety of known systems for processing a process fluid (e.g., a process liquid or gas), and can in some cases include a separator tank for separating portions of the process fluid along a particular step or operation of the processing system. Accordingly, the valve assembly 100 or portions thereof can be included on other systems for various applications and industries. Similarly, the process fluid may be any liquid gas, or multi-phase fluid mixture, including steam, water, natural gas, oil, or other chemical compounds.

In the illustrated example shown in FIG. 1, the valve assembly 100 includes a valve with valve body 102 having an inlet 104 and an outlet 106. An internal flow passage 108 extends through the valve body 102 between the inlet 104 and the outlet 106 and provides a flow path for process fluid (e.g., a process liquid or gas) of the processing system 200 to flow through the valve assembly 100. The internal passage 108 is opened and closed by a valve element 110 which is in fluid communication with the internal passage 108 between the inlet 104 and the outlet 106. The valve element 110 is movable between a closed position (not shown) and an open position (as shown in FIG. 1) within the internal passage 108. More specifically, the valve element 110 is operatively coupled to a valve actuator 112 that moves the valve element 110 between the open and closed positions. In different implementations, the valve actuator 112 can move the valve element 110 in various ways between the open and closed positions of the valve element 110 (e.g., linearly in the upward and downward directions, respectively, between open and closed positions; rotationally along a discrete rotational range, etc.).

In the illustrated example, the valve actuator 112 is configured as a two position (or "on-off") valve actuator that is generally moveable between only a first or stroked position, in which the valve actuator 112 is fully stroked, and a second or retracted position, in which the valve actuator 112 is fully retracted. Thus, with the on-off valve actuator 112 in the stroked position (not shown), the valve element 110 is in the closed position (not shown) and flow through the internal passage 108 from the inlet 104 to the outlet 106 is blocked by the valve element 110 (i.e., the valve assembly 100 is in a closed configuration (not shown)). Likewise, with the on-off valve actuator 112 in the retracted position, the valve element 110 is in the open position and maximum flow through the internal passage 108 from the inlet 104 to the outlet 106 is permitted, and, thus the valve assembly 100 is in an open configuration (as shown in FIG. 1).

In some implementations, the valve element 110 can be a ball-shaped element disposed within the internal passage 108 with a valve element opening (not shown) extending through the valve element 110. In such implementations, the on-off valve actuator 112 can be configured to rotate the valve element 110 in a first direction about a valve element axis to move the valve element 110 to the closed position to block flow through the internal passage 108. Similarly, in such implementations, the on-off valve actuator 112 can rotate the valve element 110 in either a second direction about the valve element axis, that is opposite the first direction, or further in the first direction about the valve element axis, to move the valve element 110 to the open position (e.g., so that the valve element opening is substantially parallel to the flow path of the internal passage 108 and permits maximum flow through the internal passage 108).

With continued reference to FIG. 1, in the illustrated example, the valve assembly 100 includes an integrated controller 114 that is in electrical communication with the on-off valve actuator 112 (e.g., integrated with the on-off valve actuator 112) and that is configured to control the on-off valve actuator 112 to move the valve element 110. More specifically, to move the on-off valve actuator 112 between the closed (e.g., stroked) position to the open (e.g., retracted) position, a discrete electrical signal or motor control signal (e.g., a voltage) is provided from the integrated controller 114 and is received by the on-off valve actuator 112. The valve assembly 100 can be configured such that when the integrated controller 114 provides the electrical signal the valve actuator 112 moves the valve element 110 from the open position toward the closed position (or vice versa). In some cases, if no electrical signal is provided from the integrated controller 114, the on-off valve actuator 112 can keep the valve element 110 in a present position, which can be the closed position, the open position, or one of a plurality of partially-open positions between the closed and open positions.

In the example implementation, the integrated controller 114 is configured to selectively provide one of a plurality of varying electrical signals to the on-off valve actuator 112. For example, the integrated controller 114 can be configured to condition or otherwise vary at least one of two command (or control) signals (e.g., an open-position command signal or closed-position command signal) received from a discrete sensor to provide one of a plurality of electrical signals to the on-off valve actuator 112. In some cases, the integrated controller 114 can include a pulse-width modulation (PWM) controller that can be configured to vary a pulse of the electrical signal provided to the on-off valve actuator 112.

Thus, for example, although discrete (i.e., on-off) control signals can be provided by the controller 114 to the valve actuator 112, logic implemented by the actuator 112 (or other aspect of the system 200) can result in the actuator 112, as appropriate, moving to partially open rather than fully open positions. For example, in response to varied width (or other characteristic) of the electrical signal received by the on-off valve actuator 112, the on-off valve actuator 112 can move to a plurality of partially-retracted positions between the (fully) stroked and retracted positions. Correspondingly, the valve element 110 can be selectively moved to any of a plurality of partially-open positions between the (fully) open and closed positions.

For example, when a first electrical signal is provided by the integrated controller 114, the on-off valve actuator 112 can be moved from the stroked position to a first partially-retracted position and can thus move the valve element 110 from the closed position to a first partially-open position. When a second (e.g., different) electrical signal is provided by the integrated controller 114, the on-off valve actuator 112 can be moved to a second partially-retracted position that can be more toward (or further away from) the retracted position than the first partially-retracted position. Correspondingly, in response to the second signal, the actuator 112 can moves the valve element 110 to a second partially-open position that can be more toward (or further away) from the open position than the first partially-open position. In some examples, the valve assembly 100 can be configured such that the plurality of partially-open positions of the valve element 110 includes three or more partially-open positions (i.e., equal to or less than a plurality of available partially-retracted positions of the on-off actuator 112 that may be dependent on the size and configuration of the on-off actuator 112 or the valve assembly 100).

In some cases, the on-off valve actuator 112 of the valve assembly 100 can be a pneumatically operated actuator (such as, e.g., a single acting linear pneumatic actuator) that is configured to move from the retracted position to the stroked position (or vice versa) when a fluid (e.g., air or liquid) is supplied to the on-off-valve actuator 112. In such implementations, the integrated (or other) controller 114 can be in fluid communication with the pneumatic on-off valve actuator 112 (such as, e.g. directly with the actuator 112 or indirectly with a fluid supply source of the actuator 112) and can be configured to control the pneumatic on-off valve actuator 112 to move the valve element 110 to the partially-open positions by varying the fluid (e.g., volume, pressure, etc.) supplied to the on-off valve actuator 112 (such as, e.g., from a fluid source external to the valve assembly 100). In other such implementations, the pneumatic on-off valve actuator 112 can be a pneumatically operated actuator that is configured to move from the retracted position to the stroked position when fluid is supplied to a first fluid chamber and to move from the stroked position to the retracted position when fluid is supplied to a second fluid chamber (i.e., a double acting linear pneumatic actuator). In some such implementations, the integrated (or other) controller 114 can be configured to control the pneumatic on-off valve actuator 112 to move the valve element 110 to the partially-open positions by varying flow of the first and second fluids to or from the respective first and second chambers (such as e.g., varying flow of fluid supplied to one of the chambers or varying flow of both first and second fluids between respective chambers (e.g., varying a supply flow of fluid to one chamber and varying a return flow of fluid from the other chamber)) of the pneumatic on-off valve actuator 112.

In some examples, the valve assembly 100 can include a failsafe device that can be configured to, when the integrated controller 114 is deenergized, cause the on-off valve actuator 112 to move the valve element 110 to the closed position from a present position (e.g., the open position or one of the plurality of partially-open positions) or remain in the closed position if the present position is the closed position. In some examples, a failsafe device of the valve assembly 100 can be configured to cause the valve element 110 to move to a particular failsafe position (e.g., the closed configuration) if the integrated controller 114 of the valve assembly 100 is deenergized. In some such implementations, the on-off valve actuator 112 can be configured such that the failsafe position (i.e., the position in which the valve element 110 is moved to when the integrated controller 114 is deenergized) can be set by a user (e.g., via the integrated controller 114). In some such implementations, the failsafe position of the valve element 110 can be the open position, the closed position, or one of the plurality of partially-open positions between the open and closed positions.

In some examples, the integrated controller 114 can include a memory (not shown) that stores firmware to control operations of the integrated controller 114 and the valve assembly 100 as a whole. In some examples, updates to the integrated controller 114 can thus be implemented via a wired or wireless connection to a computing system 220 external to the valve assembly 100 (e.g., a handheld or other personal computing device, a computer or network of computers of the processing system 200, etc.). Correspondingly, retrofit updates to on-site systems of the processing system 200 (e.g., to implement the methods disclosed below), can be accomplished in some cases via firmware updates.

Referring still to FIG. 1, in the illustrated example, the inlet 104 of the valve body 102 is in fluid communication with the separator tank 202 of the processing system 200 by a drain line 204. In particular, the drain line 204 is arranged within a sump region 208 of the tank 202 where, during operations of the processing system 200, separated fluid resulting from the processing system 200 can accumulate within the tank 202. Thus, separated fluid can accumulate within the sump region 208 of the tank 202 as the valve assembly 100 is in the closed configuration (not shown) with the valve element 110 in the closed position. Likewise, as shown in FIG. 1, accumulated separated fluid can be drained out of the sump region 208 of the tank 202 by moving the valve assembly 100 to the open configuration (as shown in FIG. 1) with the valve element 110 in the open position (as shown in FIG. 1), or in one of the plurality of partially-open positions (not shown), to permit flow of separated fluid through the drain line 204 to the inlet 104 of the valve assembly 100 and through the internal passage 108 to the outlet 106 of the valve assembly 100. More specifically, with the valve element 110 in the open position (as shown in FIG. 1), the separated fluid is permitted to flow at a maximum flow rate through the valve assembly 100 because the valve element 110 minimally impedes the internal passage 108. When the valve element 110 is in one of the plurality of partially-open positions, a flow rate of the separated fluid through the valve assembly 100 is partially reduced from the maximum flow rate because the valve element 110 partially impedes the internal passage 108.

The integrated controller 114 of the valve assembly 100 can be in electrical communication with one or more sensors to receive signals (e.g., control signals) from the one or more sensors that can indicate one or more measured parameters of process fluid within the processing system 200. Such sensors, for example, can be integrated with the valve assembly 100 or included elsewhere along the processing system 200, including as to measure a level or flow within one or more of a pipe connecting two or more components of the system 200 (e.g., connecting pipe 206 in communication with the outlet 106 of valve assembly 100), at a control valve of the system 200 that is upstream or downstream of the valve assembly 100, or at the separator tank 202 of the system 200. In some such implementations, the integrated controller 114 can be further configured to control the on-off valve actuator 112, to move the valve element 110 from a present position (i.e., a starting position) to a particular partially-open position of the plurality of partially-open positions, in response to receiving a control signal from the one or more sensors that corresponds to an open-position valve command. For example, the integrated controller 114 can be configured to control the valve assembly 100 to open based on one or more sensors indicating that a measured parameter (e.g., a sensed fluid level) exceeds a predetermined threshold value.

In some implementations, the integrated controller 114 can be configured to receive one of an open (or first) control signal or a closed (or second) control signal from the one or more discrete sensors and to accordingly condition or otherwise vary the electrical signal provided to the on-off valve actuator 112. Further, with the valve element 110 in a first partially-open position, the integrated controller 114 can be configured to evaluate a first criteria condition for further actuation of the valve element 110. For example, after the valve element 110 has been controllably moved to a first partially-open position, a first criteria condition can correspond to a predetermined threshold elapsed time for the first partially-open position of the valve element 110 or a determined present flow rate of process fluid through the valve assembly 100 with the valve element 110 in the first partially-open position. If the integrated controller 114 determines that the first criteria condition has been satisfied (e.g., that a threshold elapsed time or flow rate has been met), the integrated controller 114 can be configured to control the on-off valve actuator 112 to move the valve element 110 to a second partially-open position of the plurality of partially-open positions. Thus, for example, if a present partially-open valve position does not sufficiently decrease a tank level or satisfy a target flow rate, the on-off valve actuator 112 can be discretely controlled to open the valve to a more open partially-open valve position.

With the valve element 110 in the second (or other) partially-open position, the integrated controller 114 can be configured to control the on-off valve actuator 112 to move the valve element 110 to the closed position in response to receiving a second (or close) control signal. For example, a close control signal can be provided from the one or more sensors, corresponding to a closed-position valve command, including as may indicate that a measured parameter (e.g., level or flow) has decreased to within a predetermined threshold. If no such close signal is received, the integrated controller 114 can in some cases further actuate the valve element 110 based on a second criteria condition, which can be similar to or different than the first criteria condition. For example, a second criteria condition can correspond to a different (or similar) predetermined threshold elapsed time or fluid flow rate. If the integrated controller 114 determines that the second criteria condition has been satisfied, the integrated controller 114 can be configured to control the on-off valve actuator 112 to move the valve element 110 to a third position that can be either a third partially-open position of the plurality of partially-open positions or the open position (e.g., depending on criteria condition and the availability of another partially-open position).

In some cases, successive control can proceed then iteratively, with successive movement between valve positions (e.g., open, closed, and multiple partially-open positions) based on sensor signals or evaluation of relevant other conditions. In some cases, a valve can be controlled to progress through successively more open partially-open positions until reaching the open position, absent a close-position valve command. In some cases, a valve can be controlled to progress through only an enabled (e.g., user-selected) subset of possible partially-open positions, or to progress based on different (e.g., user-specified) conditions, including different time or flow threshold criteria condition.

Still referring to the example of FIG. 1, a sensor 210 is arranged within the separator tank 202 and is in electrical communication with the integrated controller 114 of the valve assembly 100. In particular, the sensor 210 can be a level sensor that is configured to measure a level of accumulated separated fluid within the sump region 208 of the tank 202 during operations of the processing system 200 and to provide a corresponding control signal to the integrated controller 114 (e.g., a discrete or binary control signal indicating only whether the sensed tank level has reached the sensor 210). Correspondingly, a digital input ("DI") 116 of the integrated controller 114 of the valve assembly 100 can receive signals (i.e., control signals) from a digital output ("DO") 212 of the level sensor 210 that can indicate the present level of separated fluid within the tank 202. In some such implementations, the sensor 210 can be a discrete sensor that provides either a first signal (e.g., an open-position command signal) or a second signal (e.g., a closed-position command signal) from the DO 212 to the DI 116 of the integrated controller 114 of the valve assembly 100.

In such implementations, the integrated controller 114 can be configured, in response to receiving the open-position command signal from the DO 212 of the sensor 210, to condition or vary the electrical signal provided to the on-off valve actuator 112 as one of a plurality of electrical signals to move the valve element 110 to a corresponding one of the plurality of partially-open positions. In some implementations, as also generally discussed above, the integrated controller 114 can include or be configured as a pulse-width modulation (PWM) controller that can be configured to vary a pulse of a control signal provided in response to signals received from the DO 212 of the sensor 210. In some implementations, the integrated controller 114 can include a first DI in electrical communication with a first DO of a first sensor and a second DI in electrical communication with a second DO of a second sensor. In such implementations, the integrated controller 114 can be configured to condition or vary the electrical signal provided to the on-off valve actuator 112 in response to one or more combinations of signals (i.e., control signals) received (or not received) from the first and second sensors.

Referring still to FIG. 1, in the illustrated example, the integrated controller 114 of the valve assembly 100 is configured to control the on-off valve actuator 112 to move the valve element 110 from the present position (e.g., the closed position) to the first partially-open position of the plurality of partially-open positions in response to determining that the present level of fluid within the tank 202 exceeds a predetermined threshold level based on a first (or open) signal received from the sensor 210. For example, in some implementations, the first signal from the level sensor 210 may indicate simply that the tank level has reached the sensor 210, as may generally correspond to an open-position command for the valve assembly 100. With the valve element 110 in the first partially-open position, the integrated controller 114 can be configured to evaluate a predetermined threshold elapsed time for the first partially-open position of the valve element 110. If the threshold is exceeded and no intervening second signal has been received and processed (e.g., a close signal from the sensor that corresponds to a closed-position command signal), the integrated controller 114 can be configured to move the valve element 110 to a second partially-open position of the plurality of partially-open positions. Thus, for example, if a less open partially-open position has not reduced the tank level within a particular amount of time, the valve element 110 of the valve assembly 100 can be moved to a more open partially-open position, as may help to reduce the tank level more quickly.

Generally, receiving a closed-position command signal (e.g., as indicates that the tank level is below a threshold) can result in control of the valve assembly 100 to move the valve element 110 to the closed position, regardless of the present (e.g. open or partially-open) position of the valve element 110. For example, with the valve element 110 in the second partially-open position, the integrated controller 114 can be configured to move the valve element 110 to the closed position in response to determining that the present tank level is below the predetermined threshold level based on a second (close) signal received from the sensor 210. In contrast, if no such second signal is received from the sensor 210, the integrated controller 114 can be configured to evaluate a predetermined threshold elapsed time (or other condition) for the second partially-open position of the valve element 110. If the elapsed time is exceeded (or other criteria condition is met), the integrated controller 114 can control the on-off valve actuator 112 to move the valve element 110 to a third position that can be either a third partially-open position of the plurality of partially-open positions or the open position. As noted above, successive control of the valve assembly 100 can then proceed similarly, as appropriate for a particular system. For example, in one control event the controller 114 can step successively through user-selected (or other) partially-open positions, according to corresponding time or flow thresholds, until reaching the open position (or until a close condition is identified and the valve is closed accordingly).

In some implementations, the valve assembly 100 can include one or more integrated sensors that can be configured to measure flow of process fluid through the internal passage 108 of the valve body 102, and the integrated controller 114 can be configured to determine a current flow rate of process fluid through the internal passage 108 based on signals from the one or more integrated sensors. In such implementations, the one or more integrated sensors can be included in addition to one or more external sensors of the processing system 200, such as, for example, the sensor 210 of the separator tank 202.

In some implementations, the valve assembly 100 can be configured such that a user can adjust (e.g., initially or subsequently set) one or more of the parameters of partially-open positions, aspects (e.g., threshold ranges) of the criteria conditions, or other configuration of open- and closed-position valve commands, or other system response parameters. For example, in some implementations, the integrated controller 114 can be configured to receive a user input that defines at least the first threshold criteria. In some such implementations, the first criteria condition can be a predetermined threshold elapsed time for the first partially-open position of the valve element 110, and the second criteria condition can be a predetermined threshold elapsed time for the second partially-open position of the valve element 110.

In some implementations, the integrated controller 114 can be configured to receive a user input that defines one or more of the first or second partially-open positions. In some implementations, the integrated controller 114 can be configured to receive a user input that designates a subset of enabled partially-open positions of a plurality of possible partially-open positions of the valve element 110 (i.e., a subset of positions selected from a total number of partially-open positions of the valve element 110, which may be dependent on the size and configuration of the valve assembly 100 and the on-off actuator 112). In some such implementations, the integrated controller 114 can be further configured such that, in response from the signal received from the sensor 210, the integrated controller 114 selects the first and second partially-open positions from the user-selected subset of enabled partially-open positions, which may or may not include the fully open position. In some implementations, the integrated controller 114 can be configured to receive a user input that can designate an open override command (e.g., corresponding to one or more of the available plurality of partially-open positions). Such an input, for example, can thus cause the integrated controller 114 to move the on-off valve actuator 112 to the closed position despite an open-position command signal being presently received by the integrated controller 114.

Correspondingly, in some implementations, the valve assembly 100 can be utilized to limit the amount of travel and number of cycles made by the on-off valve actuator 112 during operations, thus reducing wear on the on-off valve actuator 112 via operation of the valve element 110 in a plurality of partially-open positions. For example, in some implementations, the first partially-open position of the valve element 110 can be a position between the starting position and the open position, the second partially-open position can be a position between the first partially-open position and the closed position, and the third partially-open position can be a position between the second partially-open position and the closed position. In such implementations, depending on overall operating conditions of the system 200, the on-off valve actuator 112 may thus be able to drain a sufficient amount of separated fluid from the tank 202 without always fully stroking the on-off valve actuator 110 to the open position.

Similarly, the valve assembly 100 can be utilized to throttle up or throttle down flow through the valve assembly 100 from the open or closed positions of the valve element 110 by stepping through one or more of the plurality of partially-open positions of the valve element 110 to the open or closed positions. For example, the first partially-open position of the valve element 110 can be a position between the starting position and the open position, the second partially-open position can be a position between the first partially-open position and the open position, and the third partially-open position can be a position between the second partially-open position and the open position. In such implementations, by progressively opening the valve element 110 from the closed position toward the open position, the on-off valve actuator 112 may not need to fully stroke to the open position.

While the valve assembly 100 has been described in connection with a separator tank of a processing system, the scope of the present disclosure is not limited to this implementation. A wide variety of components of various systems can be improved by the valve of the present disclosure.

In some implementations, devices or systems (e.g., a valve, components of a valve, or a system including a valve) disclosed herein can be utilized, manufactured, or installed using methods embodying aspects of the present disclosure. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as examples of the disclosed technology, of the utilized features and implemented capabilities of such device or system.

Figure 2:
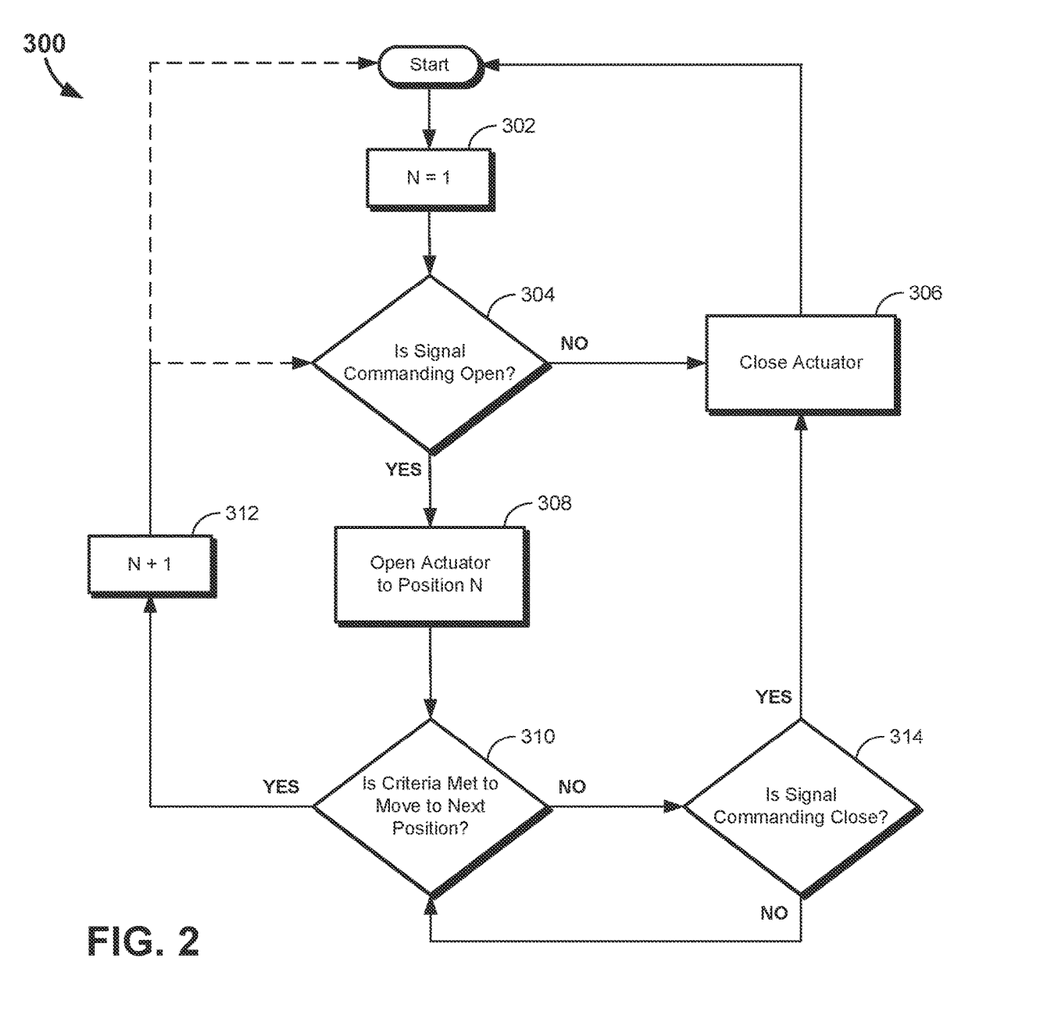
FIG. 2 is a flowchart illustrating an exemplary method of operating a valve, in accordance with principles of the present disclosure.

In this regard, FIG. 2 illustrates a method 300 for operating a valve, in accordance with principles of the present disclosure. By way of example, the method 300 will be described below with reference to the valve assembly 100 in fluid communication with the separator tank 202 of the processing system 200 of FIG. 1. However, other valves can be used (or constructed) in other systems according to other examples of the disclosed method.

In the illustrated example of FIG. 2, the method 300 may begin at block 302 where a Position N is set to N=1 (i.e., to indicate a first partially-open position of a valve) to be evaluated. The method 300 may then advance to block 304, where it is determined whether there is a signal from one or more sensors that correspond to a valve-open command (e.g., an open-position command signal from the sensor 210 received by the integrated controller 114 of the valve assembly 100 in FIG. 1). If the determination of block 304 is negative (i.e., "no"), the method 300 may advance to block 306 where the controller of the valve controls the on-off valve actuator to move the valve element from a present or starting position to a closed position, or, if the present position is the closed position, to remain in the closed position. For example, in the valve assembly 100 of FIG. 1 with the on-off valve actuator 112 in the first partially-open position, the integrated controller 114 receives the second signal (i.e., closed-position command signal) from the sensor 210 and controls the on-off valve actuator 112 to move valve element 110 from the first partially-opened position to the closed position of the valve element 110.

On the other hand, if the determination of block 304 is positive (i.e., yes), the method 300 may advance to block 308 where the valve actuator moves the valve element from the present position to the Position N (e.g., a first partially-open position if the valve is initially closed). For example, in the valve assembly 100 of FIG. 1, the integrated controller 114 receives the first signal from the sensor 210 and controls the on-off valve actuator 112 to move valve element 110 from the closed position to the first partially-opened position of the valve element 110.

Referring still to FIG. 2, with the valve element of the valve in the Position N (e.g., the first partially-open position), the method 300 may then move to block 310 to determine whether a relevant criteria condition is met to move the valve element of the valve to a second next position or Position N+1 (e.g., the next or second partially-open position). The relevant criteria condition can be a predetermined or set condition corresponding to various parameters of the valve, such as, for example, a predetermined threshold elapsed time for operation at the particular Position N or a determined present flow rate of a process fluid through the valve with the valve element in the Position N. For example, with reference again to the valve assembly 100 of FIG. 1 and with the valve element 110 in one of the plurality of partially-open positions (e.g., the first partially-open position), the integrated controller 114 can be configured to determine whether a relevant criteria condition is met to control the on-off valve actuator 112 to move valve element 110 to the next position (e.g., the second partially-opened position or the open position) of the valve element 110. For example, as also discussed above, the controller 114 can evaluate whether a predetermined (e.g., user-defined) threshold elapsed time for the present position has been satisfied, whether a determined flow rate of separated fluid is flowing through the internal passage 108 of the valve assembly 100 from the tank 202, or whether criteria conditions for other parameters of the processing system 200 are satisfied. Thus, in some examples, the relevant criteria condition as determined in block 310 can be based on internal controller signals (e.g., a clock signal) or from signals received from one or more sensors (e.g., an integrated flow sensor configured to sense a flow rate through internal passage 108 of valve assembly 100, a sensor of the processing system 200 upstream or downstream of the valve assembly 100, etc.).

With continued reference to FIG. 2, if the determination of block 310 is yes, the method 300 may advance to block 312 where Position N of the valve element is incremented (e.g., N+1), and then to blocks 304, 308, 310 as similarly discussed above, but relative to the updated Position N (i.e., as incremented at block 312). In some examples, with the determination of block 310 being yes, the method 300 can instead advance back to block 302 and reset the Position N to N=1 (as shown by the dashed line in FIG. 2), including as also dependent on receipt of a valve-close command in some cases. If the determination of block 310 is no, the flowchart may advance to block 314 where it is determined whether there is a signal from one or more sensors that correspond to a valve-close command. For example, a relevant signal may include the second or closed-position command signal from the sensor 210 received by the integrated controller 114 of the valve assembly 100 of FIG. 1 that can indicate the present level of the tank 202 is below a threshold value (e.g., with a zero or minimum signal from a level-activated level sensor). If the determination of block 314 is yes, the method 300 may move to block 306 where the valve actuator moves the valve element to the closed position. If the determination of block 314 is no, the method 300 may move back to block 310 and reevaluate whether the criteria condition is presently met to move the valve element to the second next position (i.e., Position N+1). In some examples, the criteria condition can be such that the Position N+1 or one further incremented position from Position N+1 cannot meet the criteria condition in block 310 and, thus, the method 300 results in the actuator remaining in such position until the determination in block 314 is yes and the actuator is moved to the closed position.

As also generally noted herein, operations presented in the figures can be implemented in different orders in some examples, including in parallel. Thus, for example, assessment of sensor signals relative to valve-open or valve-close commands may occur at other stages of the method 300, in parallel with other operations illustrated for the method 300, etc.

Figure 3:
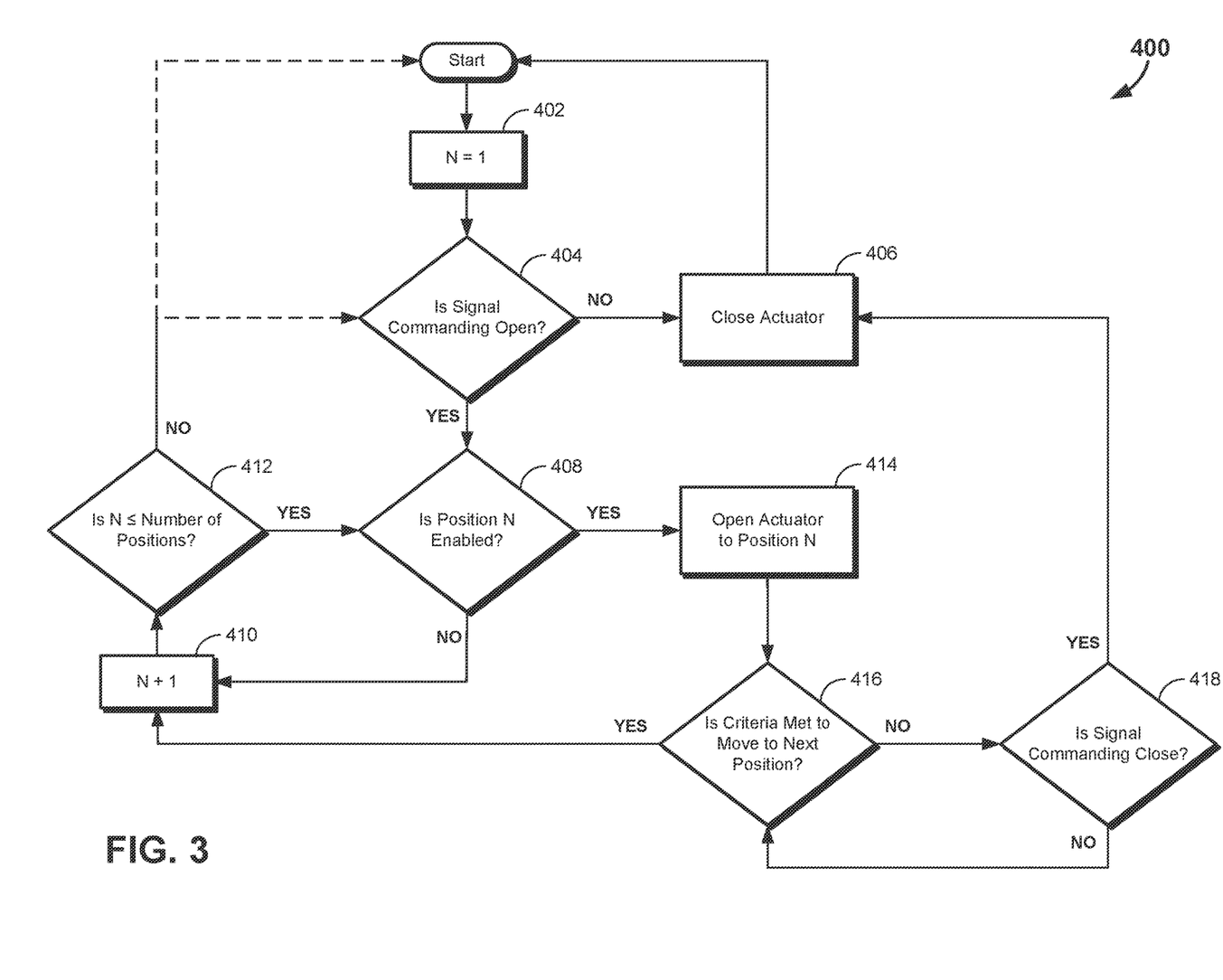
FIG. 3 is a flowchart illustrating another exemplary method of operating a valve, in accordance with principles of the present disclosure.

As briefly mentioned above, in some implementations, a valve may be configured such that a user can designate (e.g., via a user input received by a controller) one or more enabled partially-open positions of a plurality of partially-open positions of a valve element. Accordingly, FIG. 3 illustrates another example method 400 for operating a valve, in accordance with principles of the present disclosure. Similar to method 300 of FIG. 2, the method 400 of FIG. 3 will be described below with reference to the valve assembly 100 in fluid communication with the separator tank 202 of the processing system 200 of FIG. 1. However, other valves can be used (or constructed) in other systems according to other examples of the disclosed method.

In the illustrated example of FIG. 3, the method 400 may begin at block 402 where a Position N is set to N=1 (i.e., to indicate a first partially-open position of a valve). The method 400 may then advance to block 404, and to block 406 if the determination at block 404 is no, for operations similar to those described relative to blocks 304, 306 of method 300 in FIG. 2. If the determination of block 404 is yes, the method 400 may advance to block 408 where it is determined whether the Position N of the valve element is enabled (i.e., whether the Position N is an available position or one of a set of available positions included in a present control progression). For example, as also noted above relative to the valve assembly 100 of FIG. 1, the integrated controller 114 may be configured such that a user can designate a subset of enabled partially-open positions of the plurality of partially-open positions of the valve element 110 of valve assembly 100. In some examples, the controller 114 can be configured to determine a subset of enabled partially-open positions of the plurality of partially-open positions of the valve element 110 of valve assembly 100 based on a user selection of one or more operating parameters of the valve assembly 100 or the system thereof. Thus, in some implementations, some of the plurality of partially-open positions of the valve element 110 may not be enabled.

If the determination of block 408 is no, the method 400 moves to block 410 where N is incremented and then to block 412 where it is determined whether the updated Position N (i.e., as incremented at block 410) is included in (e.g., less than or equal to) a plurality of available (or enabled) partially-open positions of the valve element (i.e., a relevant total number of possible partially-open positions that may be dependent on the size and configuration of the valve and the on-off actuator). If the determination of block 412 is no (i.e., Position N+1 is greater than the relevant total number of available partially-open positions), the method 400 may move back to block 404, resulting in a general holding state at the present Position N (e.g., the open position or a most open enabled partially-open position) until a relevant signal (e.g., from a level sensor) indicates that the valve is to be closed and the method 400 can then move to block 406 and thereafter return to start. In some implementations, with the determination of block 412 being no, the method 400 can instead advance back to block 402 and reset the Position N to N=1 (as shown by the dashed line in FIG. 3), including as also dependent on receipt of a valve-close command in some cases. Thus, in such implementations, if the present position is greater than the Position N, the method 400 can result in the valve actuator being moved toward the closed position (i.e., to Position N) from the present position. For example, in such implementations, if the present position is the second partially-open position and the valve element has only two enabled partially-open positions, the method 400 can result in the valve actuator being moved from the second partially-open position back to the first partially-open position at block 414.

Referring still to FIG. 3, if the determination of block 408 is yes, the method 400 moves to block 414 where the valve element is moved from the present position to the first enabled Position N (e.g., a first next position). For example, in the valve assembly 100 of FIG. 1, the integrated controller 114 can be configured to control the on-off valve actuator 112 to move valve element 110 to the first enabled partially-open position, which can also be the first partially-opened position of the valve element 110 (or a different partially-opened position if the first partially-opened position is not enabled). With the valve element of the valve in the first enabled Position N, the method 400 may then move to block 416 which corresponds to a determination of whether a relevant criteria condition is met to move the valve element of the valve to a second enabled position (i.e., Position N+1). As also discussed above, relevant criteria conditions can include a predetermined or set condition corresponding to various parameters of the valve, such as, for example, a predetermined threshold elapsed time for the relevant partially-open position of the valve element or a determined present flow rate of a process fluid through the valve with the valve element in the relevant position.

If the determination of block 416 is yes, the method 400 may move to block 410 where N is incremented to the second next position and then to block 412 where it is determined whether the second next position is included in (e.g., less than or equal to) the plurality of available partially-open positions of the valve element. If the determination of block 412 is no, the method 400 may move back to block 402, but with the second next position (i.e., Position N+1) to be evaluated. If the determination of block 412 is yes, the method 400 may move back to block 408 where it is determined whether the second next position is enabled.

With continued reference to FIG. 3, while the determination of block 416 is no, the method 400 may successively advance to block 418 to determine whether a signal from one or more sensors corresponds to a valve-close command, such as, for example, the second or closed-position command signal from the sensor 210 received by the integrated controller 114 of the valve assembly 100 of FIG. 1 that can indicate that the present level of the tank 202 is below a threshold value. If the determination of block 418 is yes, the method 400 may move to block 406 where the valve actuator moves the valve element to the closed position. If the determination of block 418 is no, the method 400 may move back to block 416 and reevaluate whether the criteria condition is presently met to move the valve element to the second next position (i.e., Position N+1) as previously discussed.

Thus, examples of the disclosed technology can provide improved control of valves, including with relatively inexpensive on-off valves and valve actuators. Further, in some examples, innovative use of an integrated valve controller as discussed above can allow for economical installation and operation of improved systems without requiring complex or expensive retrofits or other adjustments.

In some examples, aspects of the present disclosure, including computerized implementations of methods according to the present disclosure, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, examples of the disclosed technology can be implemented as a set of instructions, tangibly embodied on a non-transitory computer-readable media, such that a processor device can implement the instructions based upon reading the instructions from the computer-readable media. Some implementations of the present disclosure can include (or utilize) a control device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the present disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular implementations of the present disclosure. Further, in some implementations, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of" For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As described herein, implementations of the disclosed technology can provide a valve and a method of operating a valve. The previous description of the disclosed implementations is provided to enable any person skilled in the art to make or use the disclosed technology. Various modifications to these implementations will be readily apparent to those skilled in the art, and the generic principles defined herein may be applied to other implementations without departing from the spirit or scope of the present disclosure. Thus, the present disclosure is not intended to be limited to the examples shown herein but is to be accorded the widest scope consistent with the principles and novel features disclosed herein.

The invention claimed is:

1. A valve assembly for a process fluid, the valve assembly comprising:
   a valve body having an inlet and an outlet, the valve body defining an internal passage that directs flow of the process fluid from the inlet through the valve body to the outlet;
   a valve element in fluid communication with the internal passage between the inlet and the outlet, the valve element being moveable between a closed position that blocks flow through the internal passage and an open position that permits flow through the internal passage;
   an on-off valve actuator operatively coupled to the valve element, the on-off valve actuator being configured to selectively move the valve element to the open position and the closed position; and
   an integrated controller configured to control the on-off valve actuator to move the valve element, and to receive signals from one or more sensors that indicate one or more measured parameters of the process fluid;
   wherein the integrated controller is further configured to:
      in response to receiving a first signal from the one or more sensors that corresponds to an open-position valve command, control the on-off valve actuator to move the valve element from a starting position to a first partially-open position of a plurality of partially-open positions between the open and closed positions;
      with the valve element in the first partially-open position, evaluate a first criteria condition for further actuation of the valve element, the first criteria condition being a predetermined threshold elapsed time;
      in response to the first criteria condition being satisfied, control the on-off valve actuator to move the valve element to a second partially-open position of the plurality of partially-open positions; and
      in response to receiving a second signal from the one or more sensors that corresponds to a closed-position valve command, control the on-off valve actuator to move the valve element to the closed position.

2. The valve assembly of claim 1, wherein the integrated controller is further configured to:
   with the valve element in the second partially-open position, evaluate a second criteria condition for further actuation of the valve element; and
   in response to the second criteria condition being satisfied, control the on-off valve actuator to move the valve element to a third position that is one of: a third partially-open position of the plurality of partially-open positions, or the open position.

3. The valve assembly of claim 1, wherein the second partially-open position is between the first partially-open position and the open position.

4. The valve assembly of claim 1, wherein the second partially-open position is between the first partially-open position and the closed position.

5. The valve assembly of claim 1, wherein the plurality of partially-open positions includes at least three partially-open positions.

6. The valve assembly of claim 1, wherein the integrated controller is further configured to determine a present flow rate of process fluid through the internal passage of the valve body based on signals from the one or more sensors.

7. The valve assembly of claim 1, wherein the integrated controller is further configured to receive a user input to define the first criteria condition.

8. The valve assembly of claim 1, wherein the integrated controller is further configured to receive a user input to define one or more of the first or second partially-open positions.

9. The valve assembly of claim 8, wherein the integrated controller is further configured to receive a user input that designates a subset of enabled partially-open positions of the plurality of partially-open positions; and
wherein, the integrated controller is configured to select the first and second partially-open positions from the subset of enabled partially-open positions.

10. The valve assembly of claim 1, wherein the inlet of the valve body is in fluid communication with a separator tank of a processing system, and the one or more sensors are arranged to sense the one or more measured parameters of the process fluid within the separator tank.

11. The valve assembly of claim 10, wherein the one or more measured parameters includes a fluid level in the separator tank; and
wherein the one or more sensors include a level sensor arranged to measure the fluid level in the separator tank.

12. A method of operating a valve, the method comprising:
providing a processing system that includes a valve body defining an internal passage that directs flow of a process fluid received from an inlet of the valve body through the valve to an outlet of the valve body, a valve element that is in fluid communication with the internal passage and that is moveable between an open position and a closed position, an on-off valve actuator operatively coupled to the valve element to move the valve element between the open and closed positions, and an integrated controller configured to control the on-off valve actuator to move the valve element and to receive signals from one or more sensors that indicate one or more measured parameters of the process fluid, with the integrated controller:

in response to receiving a first signal from the one or more sensors that corresponds to an open-position valve command, controlling the on-off valve actuator to move the valve element from a starting position to a first partially-open position of a plurality of partially-open positions;
with the valve element in the first partially-open position, evaluating a first criteria condition for further actuation of the valve element, the first criteria condition being a first predetermined threshold elapsed time;
in response to the first criteria condition being satisfied, controlling the on-off valve actuator to move the valve element to a second partially-open position of the plurality of partially-open positions; and
in response to receiving a second signal from the one or more sensors that corresponds to a closed-position valve command, controlling the on-off valve actuator to move the valve element to the closed position.

13. The method of claim 12, wherein the inlet of the valve is in fluid communication with a separator tank of the processing system; and
wherein the first signal from the one or more sensors indicates a fluid level of the process fluid within the separator tank.

14. The method of claim 12, further comprising, with the integrated controller:
with the valve element in the second partially-open position, evaluating a second criteria condition for further actuation of the valve element, the second criteria condition being a second predetermined threshold elapsed time; and
in response to the second criteria condition being satisfied, controlling the on-off valve actuator to move the valve element to a third position that is one of: a third partially-open position of the plurality of partially-open positions, or the open position.

15. The method of claim 12, further comprising, with the integrated controller:
receiving a user input that designates a subset of enabled partially-open positions of the plurality of partially-open positions, the subset of enabled partially-open positions including the first and second partially-open positions.

16. The method of claim 12, wherein the first partially-open position is between the starting position and the open position, and the second partially-open position is between the first partially-open position and the open position.

17. The method of claim 12, further comprising, with the integrated controller:
receiving a user input that defines the first criteria condition.

* * * * *